United States Patent [19]

Wong et al.

[11] Patent Number: 4,525,048
[45] Date of Patent: Jun. 25, 1985

[54] AUTOMATIC SLOT POSITIONING DEVICE FOR CAMERA TAKE-UP SPOOL

[75] Inventors: Wan C. Wong, North Point, Hong Kong; Shigeru Oshima, Tokyo, Japan

[73] Assignee: W. Haking Enterprises, Limited, Hong Kong

[21] Appl. No.: 477,247

[22] Filed: Mar. 21, 1983

[51] Int. Cl.³ .............................................. G03B 1/12
[52] U.S. Cl. ................................. 354/173.1; 354/214
[58] Field of Search ........ 354/173.1, 173.11, 212–214; 242/71.4, 71.5

[56] References Cited

FOREIGN PATENT DOCUMENTS 1087967 10/1967 United Kingdom .
1107823 3/1968 United Kingdom .
1123402 8/1968 United Kingdom .
1123403 8/1968 United Kingdom .
1165746 10/1969 United Kingdom .

Primary Examiner—John Gonzales
Attorney, Agent, or Firm—Russell E. Hattis; Ralph R. Rath

[57] ABSTRACT

A still camera includes a housing having a film chamber that is open to one side of the camera housing and is designed for drop-in loading of the film cartridge and leader. A channel leads from this side of the camera to the film path and a cavity is located at one end of the film path for receiving the film cartridge while a cavity is located at the other end of the film path which houses a take-up spool. The take-up spool has a slot for receiving the film leader and the camera incorporates drive mechanism for automatically aligning the slot of the take-up spool with the channel when the chamber door is opened. The drive mechanism forms part of the film transport system.

16 Claims, 7 Drawing Figures

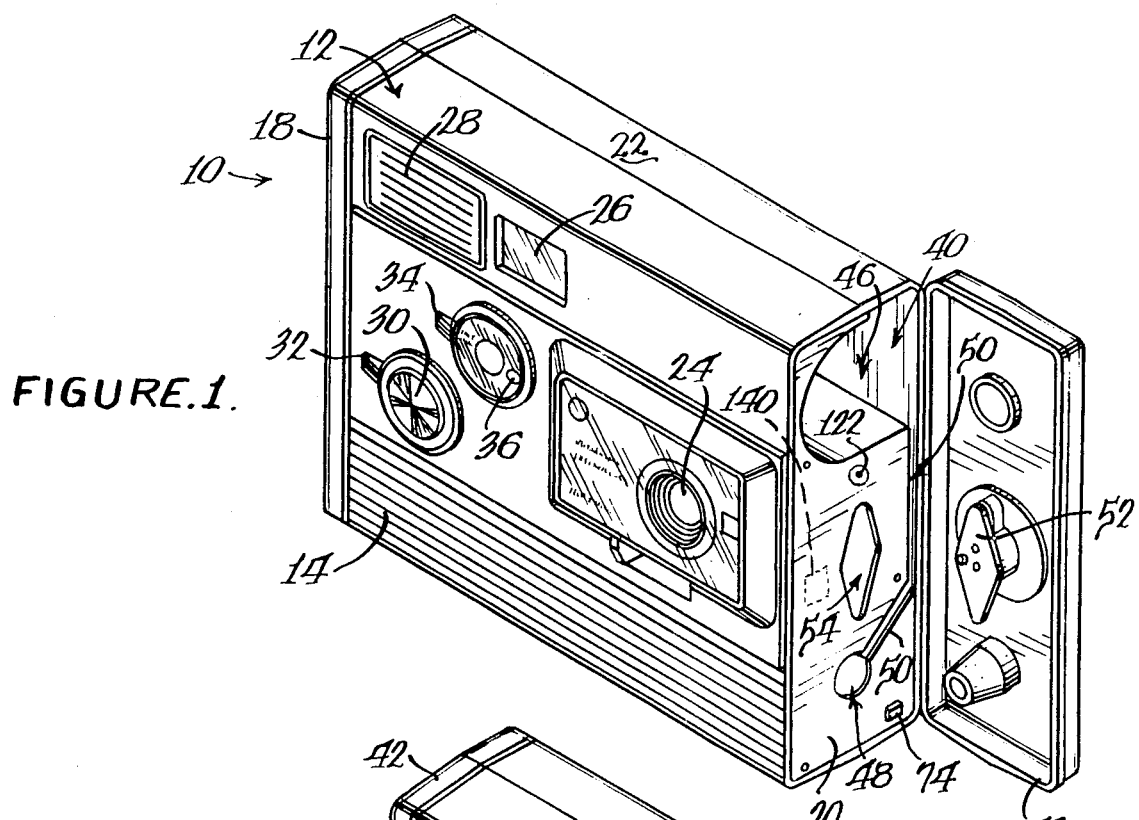

AUTOMATIC SLOT POSITIONING DEVICE FOR CAMERA TAKE-UP SPOOL

TECHNICAL FIELD

The present invention relates generally to still cameras of the 35 mm type and, more particularly, to a control system for automatically positioning the take-up spool for receipt of a film leader in a slot.

BACKGROUND PRIOR ART

Thirty-five millimeter cameras have been in existence for a number of years and have become very popular in the industry. Usually, the film for such camera is packaged into a cassette or cartridge and has a leader extending therefrom. In most such cameras, the camera has a door which extends across the rear of the camera to cover a film-receiving chamber and is opened to insert the film cartridge into the chamber which receives the cartridge and leader which are inserted into the chamber in a direction transverse to the plane of the film. In such cameras, the user manually inserts the end of the film leader into a slot of a take-up spool in the chamber which is readily visible because the entire length of the spool is visible to the user. The film has perforations on at least one edge thereof and the take-up spool has a projection that catches with a film perforation when the take-up spool is rotated manually or automatically.

There has been proposed a 35 mm still camera which incorporates a feature which is referred to as a "drop-in" film loading feature. This type of camera has a cartridge-receiving cavity and a film leader-receiving channel joining said cavity. The cavity and channel are adapted to receive the cartridge and film leader which are dropped into the same in the direction of the film plane. This cavity and channel extend from one face or edge of the camera housing into the film chamber area which defines the desired film path. The leader end-receiving slot of the take-up spool in such a drop-in loader camera is difficult to see since the cavity therefore is small and only the spool end is fully exposed. However, this slot must still be initially manually aligned with the end of the portion of the leader-receiving channel in the film path, so that the leader end will drop into the take-up spool slot. Such necessity for manually aligning the slot of the take-up spool is inconvenient, and the user can readily forget to do so, in which event the initiation of a film winding operation will not take place when the take-up spool is rotated.

A drop-in loading camera is particularly useful in a half-frame 35 mm camera where the picture frames are one half the size of a full 35 mm frame. In such case, the full frame is split transversely to the length of a full frame so that the half frame has about the same proportions of length to width in a direction across rather than along the length of the film as does a full 35 mm frame. In such case, if the drop-in film loading side of the camera is the vertical side of the camera, rather than the rear or top thereof, the film extends and is advanced vertically rather than horizontally past the imaging area. The long dimension of a half frame picture is then horizontal when the camera is held in a normal manner to obtain a similar frame orientation for a full frame 35 mm camera. The half frame drop-in loading type camera described, which provides twice the number of pictures than a full frame 35 mm camera, is the type of camera to which the present invention is applied in the exemplary form of the invention to be described, although the invention is also applicable to drop-in loaded full size 35 mm cameras.

Some of the newer types of still cameras have motor-driven take-up and cartridge spools forming what is referred to as "reverse film transport systems". In these types of cameras, as soon as a film chamber door is closed, the motor-driven film transport system is started to drive the take-up spool to pre-wind and transport the entire film, except the rear end portion thereof locked to the supply spool in the film cartridge. However, as previously indicated, such a pre-wind operation will not take place if the user does not insert the leader end into the leader end-receiving slot in the take-up spool. The pre-wound camera is then automatically set to a rewind and reverse film transport mode, and as an exposure is taken, one frame of film is rewound into the cartridge so that there is no possibility of ruining the already-exposed part of the film upon accidental opening of the film chamber door.

SUMMARY OF THE INVENTION

According to one of the features of the present invention, a drop-in loading camera is provided with an automatic slot-positioning means for the take-up reel of the camera, so that the leader end-receiving slot thereof is aligned with the leader-receiving channel whenever the door for the film chamber is opened.

In its most useful embodiment, the camera to which this invention is applied has a motor-driven film transport system, where, during a film wind or pre-wind operation, the motor is driven and coupled to the take-up spool. The automatic slot-aligning means forms part of the film advancing motor control circuit.

The drop-in loaded camera of the present invention incorporates the features thereof previously described, namely a housing having a film chamber for receiving the film cartridge with a film leader extending therefrom inserted in the direction of the film plane. The film chamber defines a film path within the housing and the housing has a channel leading from an edge of the housing to the film path. The film chamber has a cavity at one end of the film path receiving the film cartridge and a film leader channel for receiving the leader thereof at the same time. A take-up spool having a leader and end-receiving slot is located at the other end of the film path.

In the circuitry for the motor-driven film transport system, the motor is preferably energized through the contacts of which becomes energized to energize the motor when the film chamber door is opened for film loading or film removal. The automatic take-up spool-positioning means of the invention interrupts the relay energizing circuit when slot and channel alignment occurs. When the film chamber cover is closed after a new cartridge of film has been inserted, the relay is preferably again energized to initiate automatically a pre-wind or other film winding operation which brings the first unexposed frame of the film into the imaging area of the camera.

The above and other features and advantages of the invention will become apparent upon making reference to the specification to follow, the drawings and the claims.

BRIEF DESCRIPTION OF SEVERAL VIEWS OF DRAWINGS

FIG. 1 is a front perspective view of the still camera having the present invention incorporated therein with the film chamber door in the open position;

FIG. 2 is a rear perspective view of the camera;

FIG. 3 is a partial fragmentary view of a portion of one side of the housing having the film chamber door in an open position and the film and leader aligned for insertion into the camera;

DETAILED DESCRIPTION

Figure 6:
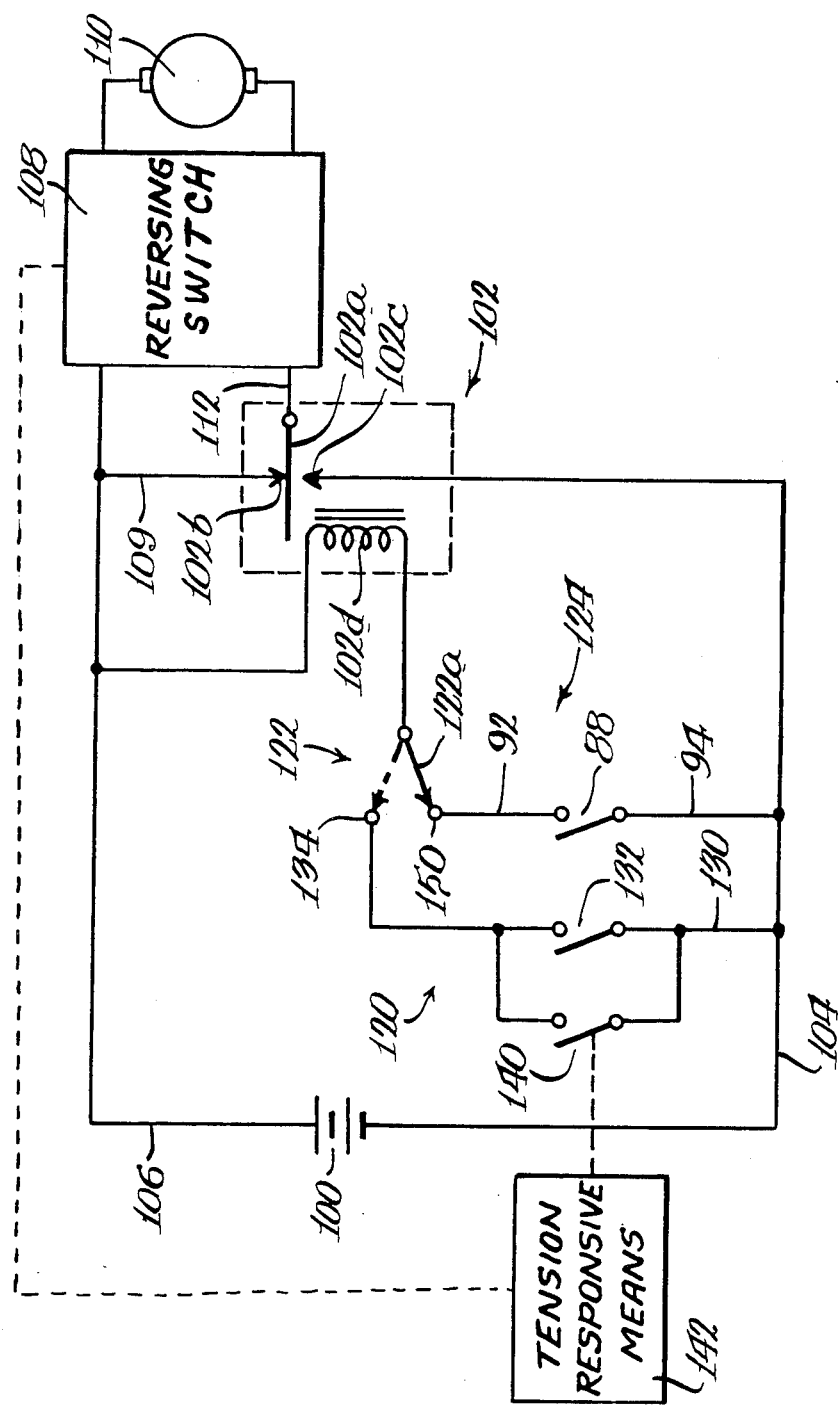
FIG. 6 is an electrical control circuit for the camera.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiments illustrated.

FIGS. 1 and 2 show a half frame still camera, generally designated by reference numeral 10, which utilizes the conventional 35 mm film. Still camera 10 includes a housing 12 having a front surface 14, a rear surface 16, opposite side surfaces 18 and 20, and top and bottom surfaces 22. The camera 10 incorporates many common features that are now found on existing 35 mm cameras which will now be generally described.

Camera 10 incorporates a lens 24, a viewfinder eyepiece 26 and a built-in unit flash 28. However, as shown in FIG. 1, the lens 24 is offset from the center of the camera, for a purpose that will be described later. Camera 10 also incorporates a shutter release button 30, a mode selector switch 32, a film speed setting lever 34, and a film speed window 36 giving an indication of the setting of the film speed that has been selected.

Figure 5:
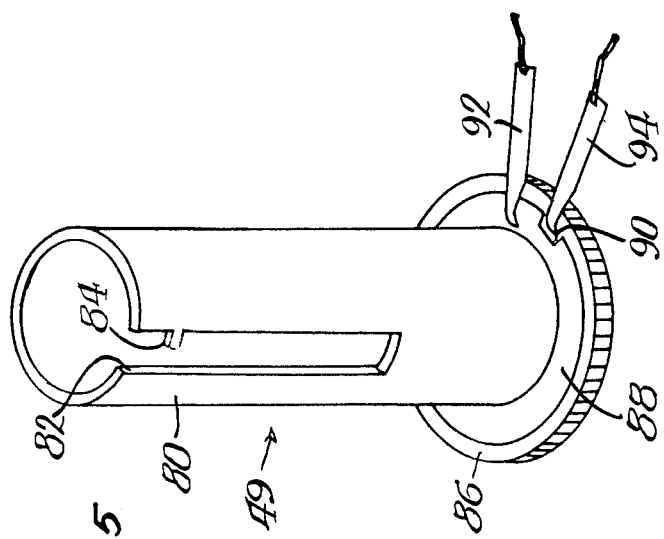
FIG. 5 is a perspective view of the take-up spool.

The present invention has its most useful application to a half frame, 35 mm drop-in loaded camera as illustrated. This camera has a film compartment or chamber 40 located along one vertical side 20 of the camera housing 12 and is enclosed by a film chamber door 42 which is hinged to the housing by a hinge 44 (FIG. 2) along one vertical edge thereof. The film chamber has an upper cavity 46 for receiving a film cartridge or cassette and a lower cavity 48 which houses a take-up reel or spool 49 (FIG. 5). Cavities 46 and 48 are interconnected by an elongated channel 50 leading to a film path in the housing.

Figure 3A:
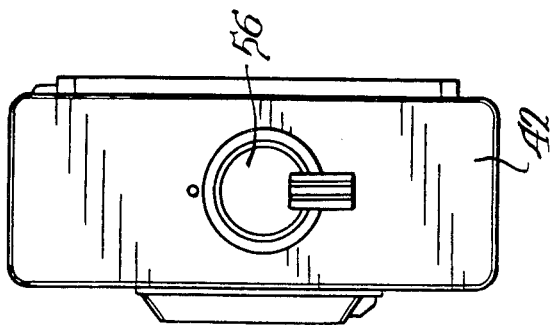
FIG. 3A is an end view of the film chamber door end of the camera.

The film thus preferably traverses the camera in a vertical direction useful in half-frame cameras for reasons previously explained. The door 42 is held in a locked position by a non-circular latching member 52 received into a correspondingly shaped opening 54 in the end wall 20 of the housing 12. The latching mechanism 52 is moved between open and closed positions through a lever or knob 56 (FIG. 3A) that is located outside of the cover.

Figure 4:
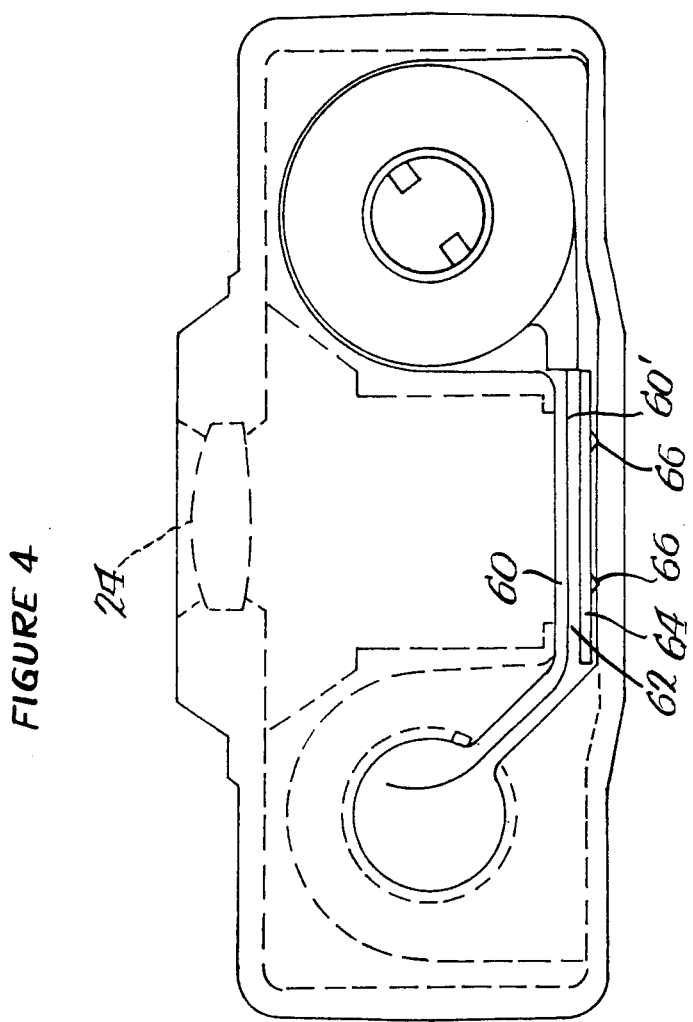
FIG. 4 is a diagramatic view of the film chamber with the cover or door removed.

As illustrated in FIG. 4, the camera has an imaging area 60 with a film plane establish surface 60′ that is generally aligned with lens 24 and is located on one side of the film path 62. A pressure-plate 64 is normally biased towards the imaging area 60 by a biasing spring 66 which maintains the film in engagement with the film plane surface 60′ during the exposure of the film therein. The details of movement of the pressure-plate for film loading are disclosed in a co-pending application entitled "Still Camera With Pressure-Plate Control Device", incorporated herein by reference U.S. Ser. No. 477,246.

As indicated above, the use of drop-in loading has significant advantages over the cameras of the type having rear chamber door loading, as in now conventional. With the film path being in a vertical position, an ideal half-frame format results with the long dimension thereof being along the horizontal axis of the frame. Also, in such case, the spacing between the film cavity and the take-up spool cavity is reduced to approximately one-half the distance that is found in conventional rear compartment film cavities, which in turn reduces the length of the leader necessary for threading the leader or tongue portion of the film into the take-up spool.

In the drop-in loading system disclosed and described, the operation of the loading of the camera becomes a very simple expedient and reduces the possibility of misloading the camera to a minimum. Film loading may be accomplished by orienting the camera with the film chamber side of the camera facing upwardly (FIG. 3), opening the chamber door 42 and dropping the film cartridge 70 into the supply cavity 46 with the film leader or tongue portion 72 of the film passing into the channel 50. In order to insure that the proper amount of lead portion of the film is exposed, the side 20 of the camera housing has an identifying indicia or marker 74 so that the user can pull the free end of the film to the identifying marker 74, to provide the proper length of film necessary to have the film leader received into the slot of the take-up spool. After the proper length of film leader is exposed, the operator need only drop the film cartridge and the film leader into the channel 50 and cavities 46 and 48 and the film is loaded and ready for use.

According to the present invention, the camera 10 incorporates a simple system which is capable of automatically aligning the slot of a take-up with the film path whenever the camera door is open for replenishment of a used film cartridge.

The details of the take-up spool are illustrated in FIG. 5 where it is seen that the spool 49 consists a generally tubular member 80 that has an elongated slot 82 extending from one open end thereof. Spaced inwardly from the free open end of the spool, a projection 84 extends into the slot for a purpose that will be described later.

Spool 49 also includes an annular flange 86 extending radially from the other end of the tube 80 and annular flange 86 has an annular conductor 88 supported on one surface thereof. Conductor 88 has an interrupted portion 90. A first contact 92 is mounted in the housing so as to be in continuous engagement with the conductor at a point radially inwardly of the interruption 90 and forms part of a circuit that will be described later. A second contact 94 is in circumferential alignment with the interruption and also forms part of a circuit that will be described later. The circuit for automatically aligning the slot 82 with the film path is part of the circuit which drives the film during other camera operations.

This circuit is illustrated in FIG. 6 and includes a DC battery source 100, such as one or more AA batteries, that are connected to the coil of a relay 102 through leads 104 and 106. Lead 106 is also connected through a reversing switch 108 to a drive motor 110. The relay has movable between stationary contacts 102b and 102c. Conductor 109 connects lead 106 to contact 102b and lead 104 is connected to contact 102c. The movable pole 102a is connected to reversing switch 108 through a lead 112.

As illustrated in FIG. 6, the circuit incorporates a film transport circuit 120 including a single pole two-position switch 122. Switch 122 is normally biased to the position illustrated by the solid lines in FIG. 6 where the movable pole 122a thereof is moved by and in response to pressure or force from contact with stationary contact 150 to the dotted line position illustrated in FIG. 6 where it contacts stationary contact 134. This movement is preferably performed when the chamber door is closed. When it is opened, pole 122a engages contact 150.

The film transport circuit consists of a lead 130 connecting a normally open film transport switch 132 in parallel with a film tension end-of-film latching switch 140. This parallel switch circuit is connected to stationary contact 134 of switch 122. The closing of switch 132 is controlled by the shutter release button so that the switch is closed whenever the shutter has operated to automatically advance the film to the next film frame. The switch 140 is latched closed to initiate a pre-wind operation when the film chamber door is latched closed after a new film cartridge is loaded into the camera. It is latched open when the pre-wind operation terminates by a film tension sensing means 142.

When the pre-wind operation has ended, the tension in the film causes means 142 to latch open the switch 140 and reverse the connections of reversing switch 108.

The slot-positioning circuit 124 includes conductor 88 acting as a movable bridging contact normally bridging contacts 92 and 94 when the leader end-receiving take-up spool slot 82 is not aligned with the leader-receiving channel 50. Except when such alignment occurs bridged contacts 92 and 94 connect one terminal of DC battery source 100 to contact 150 of the door position responsive two-position switch 122.

The operation of the camera for automatic slot positioning, film rewind and film advancement will now be described. Initially, the film chamber door is opened for insertion of a new cartridge of film therein. When the door is open, the bias of a spring in switch 122 will move the switch arm to the solid line position where under such a misalignment conduction switch pole 122a connects the battery to the relay coil 102a to energize the same. Relay pole 102a then engages relay contact 102b to connect the battery through reversing switch 108 to energize the motor which rotates the take-up spool in a pre-wind direction until such time as contact 94 is received in conductor interruption 90 indicating alignment of slot 82 and channel 50, whereupon the contacts 92 and 94 of slot-positioning circuit 124 become disconnected to de-energize the motor.

The film cartridge with the leader is then inserted into the cavity 46 and channel and the end of the film leader will be received into the aligned take-up spool slot 82. The take-up spool projection 84 will be aligned with the upper row of perforations in the film leader when the film leader and cartridge are fully inserted into the film chamber.

After the film cartridge has been inserted, and the film chamber door 42 is moved to the closed position and locked thereby latching switch 140 closed, the movable pole 122a of the door switch 122 will be moved from the contact 150 to the contact 134 to connect the relay coil 102d to the circuit branch containing the parallel connected switches 140 and 132. Relay 102 is then energized again to operate the motor in a pre-wind direction. When all of the film has been rewound onto the take-up spool, the tension of the film will be sensed by tension-sensing means 142. Sensing means 142 latches open switch 140 to terminate the energization of relay coil 102d and the motor, and, at the same time, actuates reversing switch 108 to reverse the connections of the motor, uncouples the motor drive from the take-up spool, and couples the motor to the take-up spool in the cartridge to drive it in a direction to rewind the film on the spool, in any suitable manner, such as disclosed in German Publication No. 2,151,370. At this time, the camera is ready for exposure of the various frames on the camera. As indicated above, each time a picture is taken by actuation of the shutter release button, the switch 132 in parallel with now latched open switch 140 is momentarily closed to advance the next unexposed half frame of the film to the imaging area.

The present invention has thus provided a very unique, easy-to-load, unload and operate camera.

It should be understood that numerous modifications may be made in the most preferred forms of the invention described and shown in the drawings without deviating from the broader aspects of the invention.

We claim:

1. In a still camera including a housing having a film chamber for receiving a film cartridge with a film leader extending therefrom, said chamber defining a film path therein and including a cartridge-receiving space for receiving said cartridge for drop-in loading and located at one end of said film path, a take-up spool space at the other end of said film path having a take-up spool, said take-up spool having a slot for receiving the end of the film leader, the improvement comprising aligning means for automatically aligning said take-up spool slot with said film path for receipt of the film leader in said slot when said camera is conditioned to receive a film cartridge in said cavity, a manually-operable means including a film chamber door initially covering said chamber and movable thereon to uncover the same, and wherein said aligning means includes motor means for driving said take-up spool, and means responsive to the opening of said door to operate said motor means to drive said take-up spool until said slot is aligned with said film path.

2. A still camera as defined in claim 1, further including switch means cooperating with said door for initiating the energization of said motor means to move said take-up spool in alignment with said film path when said door is moved to an open position.

3. The still camera of claim 1 wherein said motor means is a DC electric motor, and there is provided switch means responsive to the closure of said door to energize said DC motor to effect a film winding operation.

4. In a still camera including a housing having a film chamber for receiving a film cartridge with a film leader extending therefrom, said chamber defining a film path therein and including a cartridge-receiving space for receiving said cartridge for drop-in loading and located at one end of said film path, a take-up spool space at the other end of said film path having a take-up spool, said take-up spool having a slot for receiving the end of the film leader, the improvement comprising aligning means for automatically aligning said take-up spool slot with said film path for receipt of the film leader in said slot when said camera is conditioned to receive a film cartridge in said cavity, a manually-operable means for effective slot alignment, motorized film transport means for driving said take-up spool for moving said film along said film path during operation of the camera, said aligning means for aligning said slot with said film path including means responsive to operation of said manually-operable means for energizing said motorized film transport means until said slot is aligned with said film path.

5. A still camera as defined in claim 4, in which said take-up spool has a rotatable conductor connected thereto for rotation therewith with an interruption at one point on the periphery thereof, an electric circuit for said motorized film transport means including a first contact in continuous contact with said rotatable conductor and a second contact in alignment with the portion of said rotatable conductor including said interruption such that when said take-up spool slot is aligned with said film path said second contact reaches said interruption which opens said circuit to de-energize said motorized film transport means.

6. A still camera as defined in claim 5, in which said electric circuit includes a branch in parallel with said first and second contacts and including first switch means for energizing said motorized film transport means to wind said film on said take-up spool after loading of said film.

7. A still camera as defined in claim 6, in which said manually operable means includes a door for opening and closing the film chamber, control means responsive to opening of said door for connecting said second contact to said motorized film transport means and responsive to closure of said door to disconnect said first and second contacts from said transport means and to connect said first switch means thereto.

8. In a still camera including a film chamber for receiving a film cartridge with a film leader extending therefrom, said chamber defining a housing having a film path therein with a space at one end receiving said cartridge, a space at an opposite end of said film path supporting a take-up spool having a leader end receiving slot extending axially thereof and a leader-receiving channel extending from an edge of said housing to said film path and a door covering said chamber, the improvement comprising a motorized film transport means for driving said take-up spool to wind said film thereon, and circuit means responsive to the opening of said door for energizing said film transport means until said slot is aligned with said channel.

9. A still camera as defined in claim 8, in which said circuit means includes a switch responsive to closure of said door for energizing said motorized film transport means.

10. A still camera as defined in claim 9, in which said circuit means includes relay means for activating said motorized film transport mechanism, a first branch circuit with a film chamber door operated switch leading to said relay means and a parallel branch circuit with a take-up spool operated switch for advancing said take-up spool to align said slot with said channel.

11. A still camera as defined in claim 10, in which said parallel circuit includes a conductor movable with said take-up spool and having an interrupted portion, a first contact in continuous engagement with said conductor and a second contact aligned with said interrupted portion when said slot and channel are aligned.

12. In an automatic still camera including a housing having a film chamber for receving a film cartridge with a film leader extending therefrom, said chamber defining a film path therein, a cavity at one end having a take-up spool rotatable therein, and a cavity at the opposite end of said film path for receiving said cartridge with said leader extending therefrom along said film path, said take-up spool having an axial slot for receiving the end of said leader, and said housing having a leader-receiving channel extending from one edge to said film path for receiving said leader, the improvement comprising electric take-up spool drive means including first means for energizing said drive means for advancing said film along said film path after film is loaded into said camera, and means for automatically energizing said drive means for aligning said slot with said channel when access to an expended roll of film in said chamber is obtained.

13. An automatic still camera as defined in claim 12, in which said housing has a door for opening and closing said film chamber, and circuit means for energizing said drive means and including switch means cooperating with said door for selectively conditioning said circuit means to energize said drive means for film advancement when said door is closed and to energize said drive means for moving said slot into alignment with said channel when said door is moved to an open position.

14. An automatic still camera as defined in claim 13, in which said drive means includes electric motor means, said circuit means including relay means, a first branch with switch means for operating said relay means to energize said drive means for advancing said film along said path, a second branch in parallel with said first branch and including switch means for operating said relay means to energize said drive means to align said slot with said channel, and a film chamber door responsive switch for alternatively connecting said first and second circuits to said relay means when said door is respectively opened and closed.

15. An automatic still camera as defined in claim 14, in which the latter switch means includes an annular flange on said take-up spool extending therefrom and a conductor supported on said annular flange with an interrupted portion on said conductor, a first contact in continuous engagement with said conductor and a second contact in engagement with said conductor except when aligned with said interrupted portion.

16. An automatic still camera as defined in claim 14, in which the latter switch means including a conductor rotatable with said spool, a first contact in continuous engagement with said conductor, a second contact in intermittent engagement with said conductor to interrupt movement of said take-up spool when disconnected with said conductor.

* * * * *